Aug. 24, 1965   J. R. V. DOLPHIN   3,202,242
INDUSTRIAL TRUCK WITH AN ELEVATABLE OPERATOR PLATFORM
THAT IS MOVABLE WITH AND RELATIVE
TO THE LOAD HANDLING MEANS
Filed April 10, 1963   9 Sheets-Sheet 1
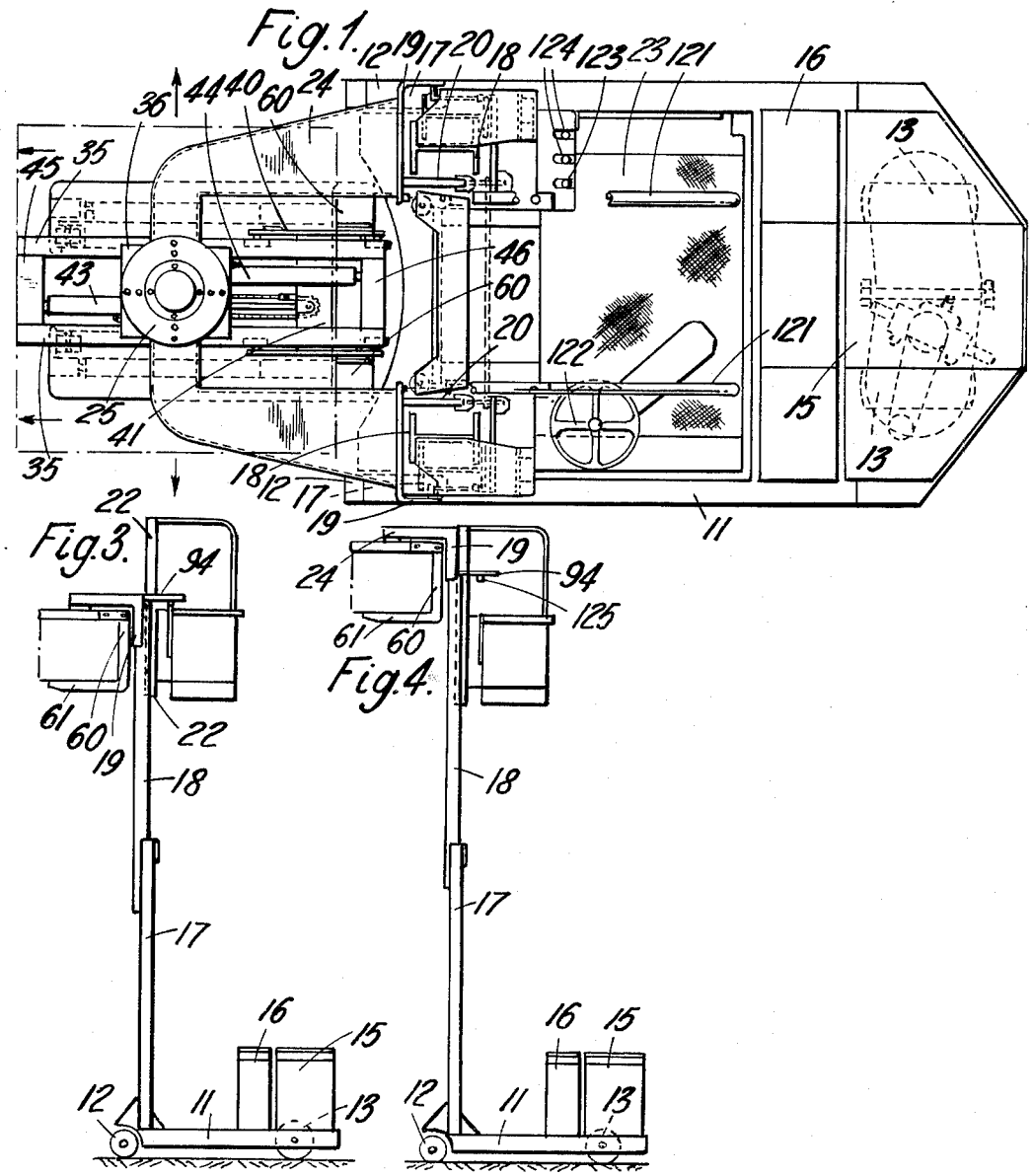
INVENTOR
John R. V. Dolphin
By E. L. LeGates
ATTORNEY

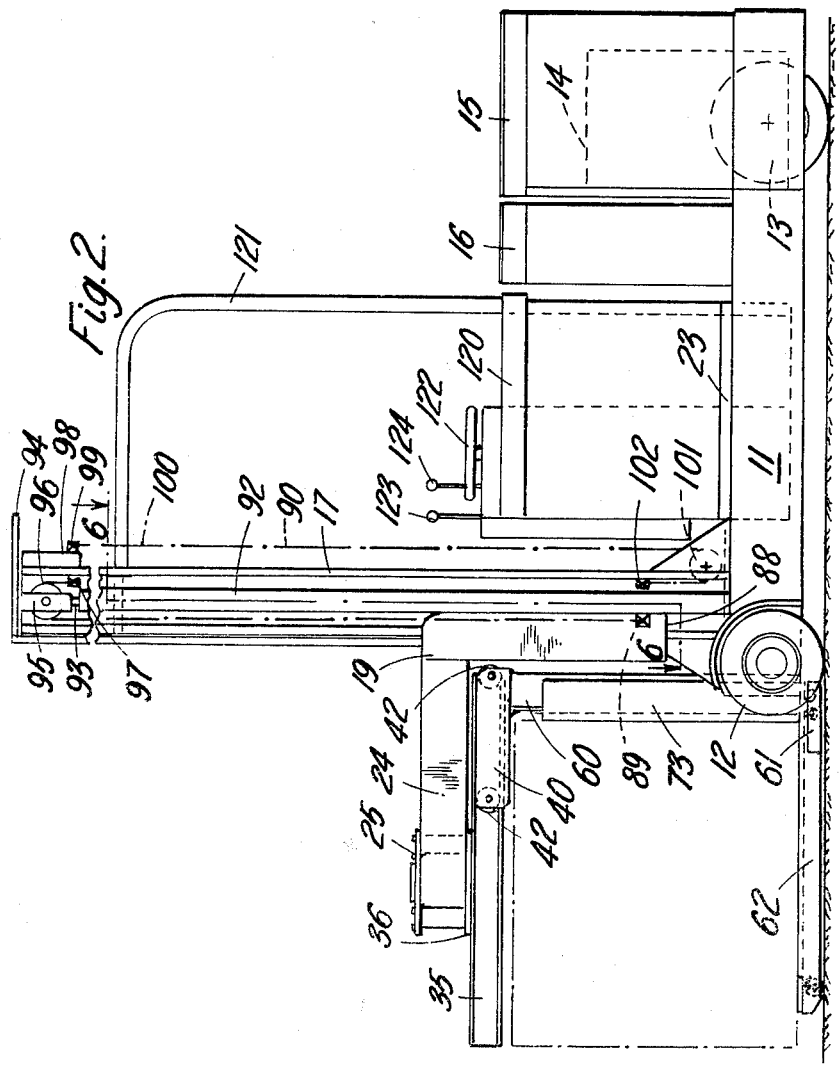

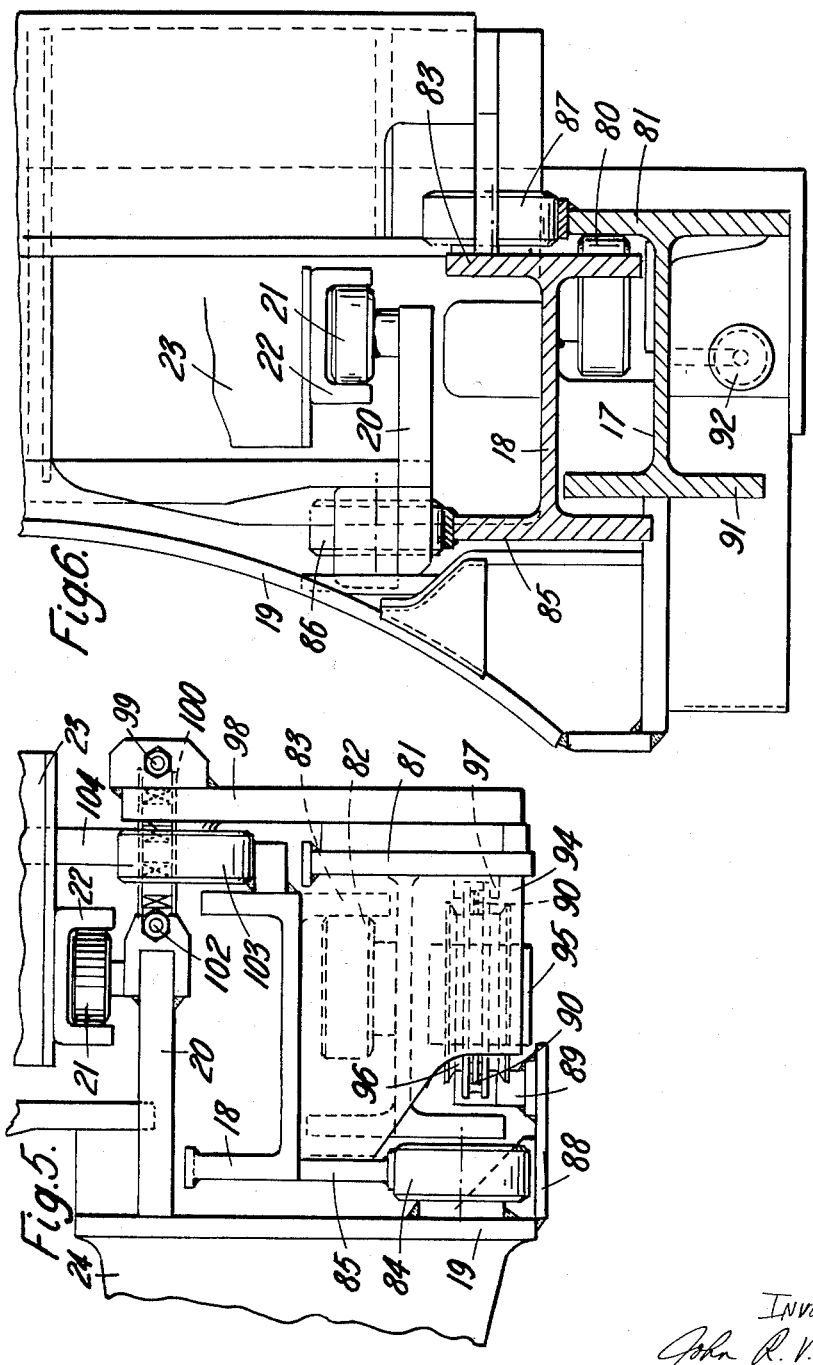

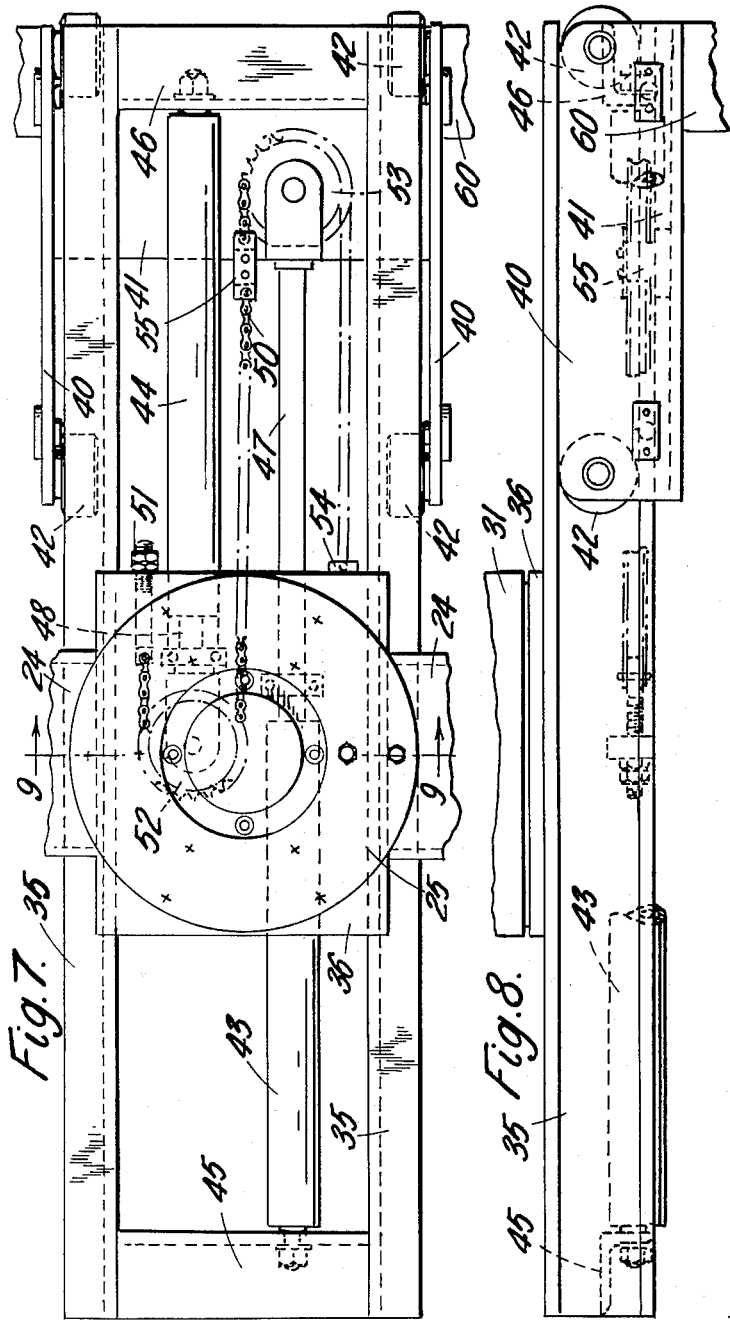

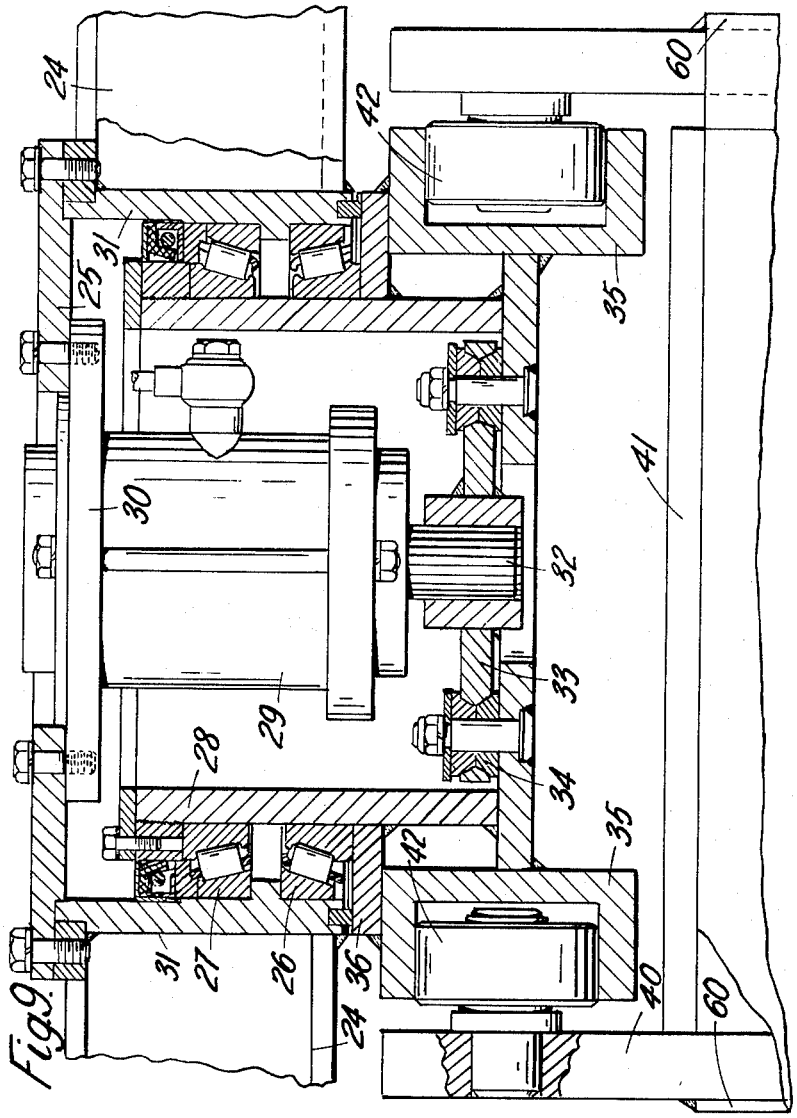

Aug. 24, 1965    J. R. V. DOLPHIN    3,202,242
INDUSTRIAL TRUCK WITH AN ELEVATABLE OPERATOR PLATFORM
THAT IS MOVABLE WITH AND RELATIVE
TO THE LOAD HANDLING MEANS
Filed April 10, 1963    9 Sheets-Sheet 6
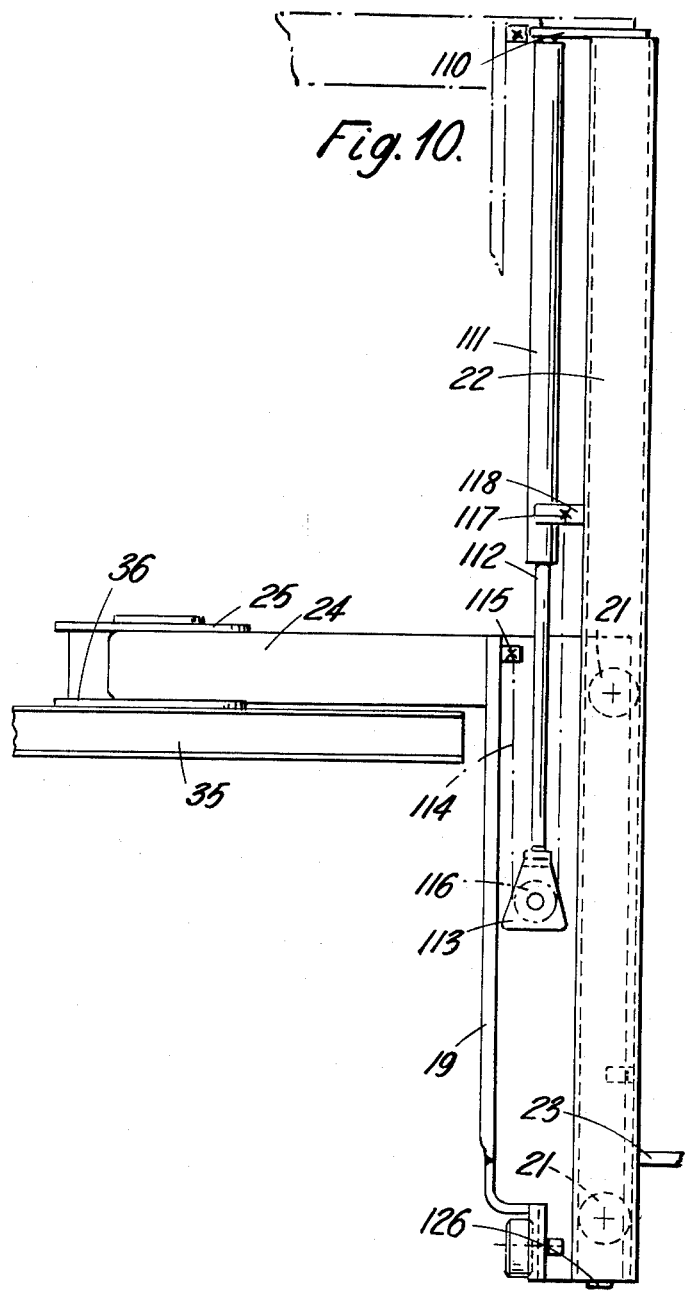
INVENTOR
John R. V. Dolphin
BY
E. L. LoHale
ATTORNEY

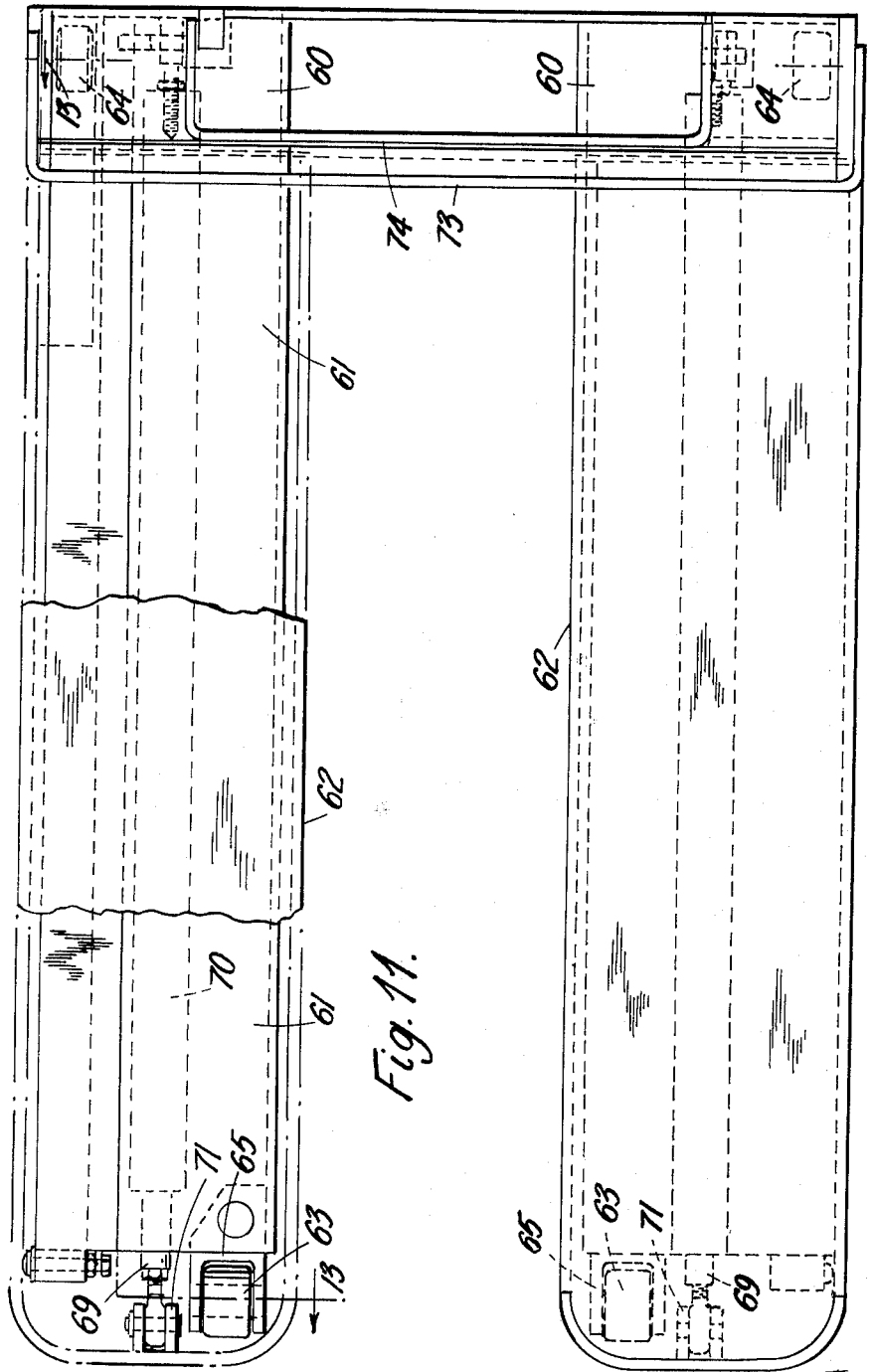

Aug. 24, 1965 J. R. V. DOLPHIN 3,202,242
INDUSTRIAL TRUCK WITH AN ELEVATABLE OPERATOR PLATFORM
THAT IS MOVABLE WITH AND RELATIVE
TO THE LOAD HANDLING MEANS
Filed April 10, 1963 9 Sheets-Sheet 8
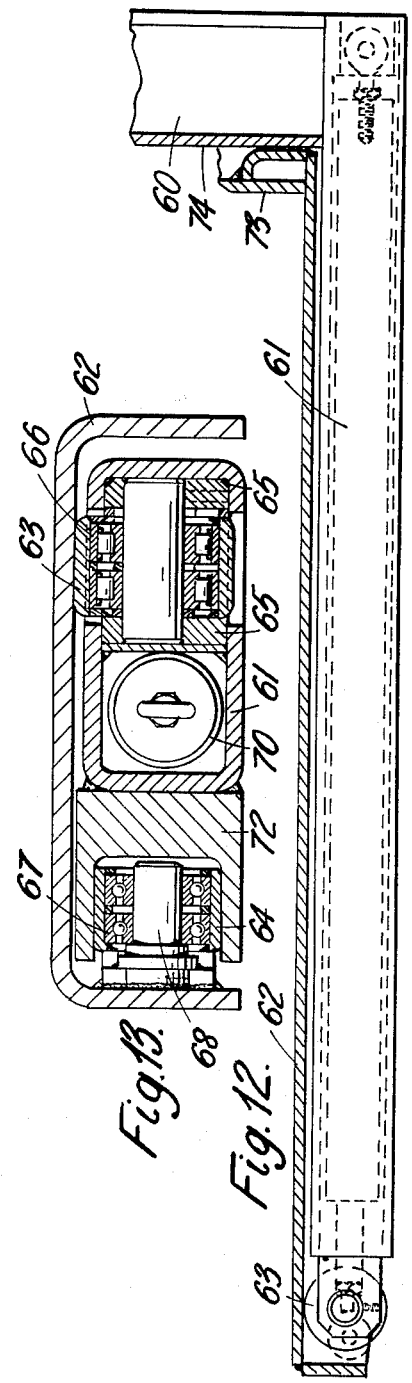
INVENTOR
John R. V. Dolphin
By E. J. LeGates
ATTORNEY

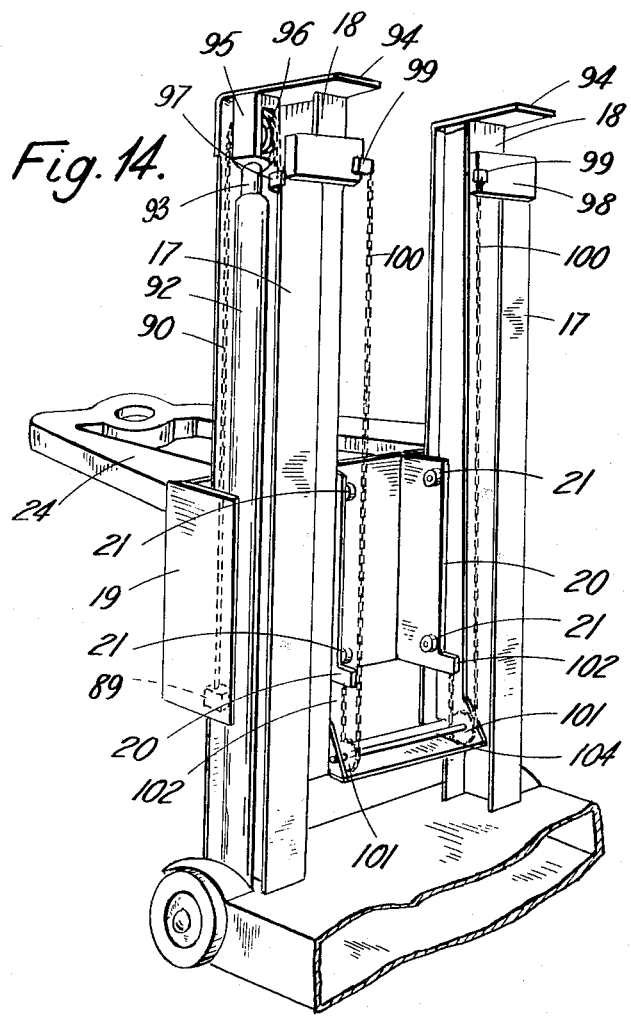

United States Patent Office

3,202,242
Patented Aug. 24, 1965

3,202,242
INDUSTRIAL TRUCK WITH AN ELEVATABLE OPERATOR PLATFORM THAT IS MOVABLE WITH AND RELATIVE TO THE LOAD HANDLING MEANS
John Robert Vernon Dolphin, Basingstoke, England, assignor to Lansing Bagnall Limited, Basingstoke, England, a British company
Filed Apr. 10, 1963, Ser. No. 272,132
Claims priority, application Great Britain, Apr. 13, 1962, 14,345/62
4 Claims. (Cl. 187—9)

This invention comprises improvements in or relating to fork and like load-lifting trucks.

In our United States application Serial No. 109,587, now abandoned, there is described a truck having a turntable which is mounted so as to be able to cause rotation of a load-lifting device, such as a pair of forks, which are also given a rising and falling movement, the turntable being associated with reach mechanism for advancing and retracting the forks and the operator being provided with a support by means of which he can rise and fall with the rising and falling movement of the load-lifting device. The present invention relates to a further construction of truck for rotating and reach movement for forks or like load-lifting devices.

According to the present invention, in a truck with a mast and lifting carriage thereon, there is provided on the carriage a turntable which overhangs from the mast, guide means for a horizontally movable reach carriage on the turntable, and a load-lifting device which depends from said guide means toward the ground. Preferably the load-lifting device comprises a depending arm and fork-arms extending laterally from the lower end of said arm.

It is a feature of the invention that the fork-arms are not only movable with a reach movement by the movement of the horizontally movable reach carriage on the turntable but that they may be given a further reach movement by making them extensible. This permits of long reach movements when such are required without necessitating an unduly large turntable and it also enables the forks to be extended beneath larger loads than would otherwise be the case.

It is a further feature of the invention that there is provided an operator-support which is movable up and down with the lifting carriage. The operator-support may move with the lifting carriage for the whole of the movement of the latter or, if desired, the operator-support may be given an additional rising and falling movement relatively to the lifting carriage. This is particularly useful at the upper end of the lifting movement, because it enables the operator-support to be raised relatively to the carriage during the main part of the movement to give the operator a better view but permits the carriage, when below a ceiling or roof, to be lifted to the maximum extent without being limited by the operator-support projecting higher than the carriage.

The following is a description, by way of example, of one construction in accordance with the invention:

In the accompanying drawings:

FIGURE 1 is a plan of a truck in accordance with the invention;

FIGURE 2 is a side elevation of the same;

FIGURE 3 is a side elevation to a smaller scale, showing the load partially lifted;

FIGURE 4 is a similar view showing the load lifted to the maximum extent;

FIGURE 5 is an enlarged detail of part of the plan shown in FIGURE 1;

FIGURE 6 is a horizontal section upon the line 6—6 of FIGURE 2;

FIGURE 7 is a plan to an enlarged scale of part of the reach mechanism;

FIGURE 8 is a side elevation of the same;

FIGURE 9 is a section to an enlarged scale upon the line 9—9 of FIGURE 7;

FIGURE 10 is a side elevation of an auxiliary mast mechanism which connects the reach mechanism and the operator-platform;

FIGURE 11 is a plan of the load-lifting fork arms;

FIGURE 12 is a side elevation of the same;

FIGURE 13 is a section upon the line 13—13 of FIGURE 11,

FIGURE 14 is a perspective view, somewhat digrammatic, showing the hoisting mechanism.

The truck comprises a heavy body 11 with two wheels 12 at the front corners on fixed axes and two steering and propelling wheels 13 at the back and appropriate driving mechanism 14 in a case 15 over the back wheels, a battery box 16 and a low unobstructed space between the battery box 16 and the front end of the chassis. At the front end there is a fixed mast 17 and on the mast an extending section 18 and, running in the extending section, a load-lifting carriage 19. Each of the masts is formed of two separate joist-section members and the space between the two sides of the masts is unobstructed so that the load-lifting carriage 19 can run up and down freely. The carriage has brackets 20 extending rearwardly between the inner sides of the extending section 18. The brackets 20 carry rollers 21 which run in channel-shaped guides 22, best seen in FIGURES 3, 4 6, and 10, which form an auxiliary mast. Between the channel-shaped guides of the auxiliary mast there is secured an operator-platform 23 which extends rearwardly over the low portion of the truck body behind the mast 17. The operator-platform and auxiliary mast are movable up and down relatively to the carriage 19, as hereinafter described. The carriage 19 has a forwardly-extending bracket 24 which, in the lowest position of the carriage 19, is well spaced above the ground and has secured to its outer end a turntable mounting 25.

The turntable mounting 25 is best seen in section in FIGURE 9 and comprises an upper flange portion and a depending hollow cylinder 31 containing roller bearings 26, 27 for supporting a short length of large diameter tubular rotatable structure 28. The structure 28 is rotatable upon the bearings and is operated by a hydraulic vane motor 29 whereby it may be rotated by power under the control of the operator. The vane motor 29 is secured by a flange 30 to the mounting 25 and has a splined shaft 32 connected by a coupling flange 33 and rubber blocks 34 to the lower part of the tubular structure 28. Below the tubular structure 28 of the turntable there are carried two channel-shaped guides 35 disposed parallel to one another with their flanges facing outwardly and their backs secured to the underside of a square flange 36 mounted on the vertical tubular structure member 28 of the turntable. The channel-shaped members 35 extend in both directions from the turntable. They are made of as great a length as will clear the mast if the turntable is rotated, and thus the length of the guide channels 35 is determined by the amount of overhang of the bracket 24 which carries the turntable.

On the guide channels 35 there is an underhung carriage 40, made of two stout side-plates connected by a horizontal bottom-plate 41. The side-plates carry rollers 42 to run in the channels 35.

In order to move the carriage along the horizontal channel-shaped guide members 35 there are provided two hydraulic cylinders 43, 44 (FIG. 7) which are located beneath the turntable mounting between the backs of the channel-shaped guides 35, one secured to a cross-member 45 at one end of the guides and the other to a cross-member 46 at the other end. The two clinders 43, 44 carry rams 47, 48 which face in opposite directions and they are staggered, one to one side and the other to the other side of the centre line between the guides. A chain 50 is fixed to an achorage 51 on the twintable and extends horizontally around a pulley 52 on the ram 48 and thence along the centre line between the guides to a pulley 53 on the other ram and back to a second fixed anchorage 54 on the turntable. The centre of this chain is secured at 55 to the plate 41 of the carriage. If one of the cylinders 43, 44 is supplied with pressure and the other is open to exhaust, the chain 50 will be urged in one direction and the carriage 40 will move along the guides 35 towards one end thereof. If the supply of pressure and the opening to exhaust is reversed, the carriage 40 will move toward the other end of the guides.

At one end of the carriage 40, which normally lies nearest to the mast 17 when the turntable is arranged to carry the guides in a fore and aft direction as shown in the drawings, there is a stout depending arm 60 which is formed of two members, one depending from one corner of the carriage 40 and the other from the other corner, which corners, in the position stated, are nearer to the mast. The two depending members of the load-lifting arm 60 extend downwards to a position which in the lowermost position of the lifting carriage on the mast is close to the ground. Here, the two depending members carry horizontal forwardly-directed box-section members 61 which form the roots of fork-arms. These forwardly-directed box-section members carry over each of them a hollow inverted channel-section fork-arm 62. Each of the hollow fork-arms 62 is supported from the box-section member over which it slides by appropriate rollers 63, 64. The rollers 63 at the front end are secured to brackets 65 carried at the outer or front ends of the box-section members 61 and they run on roller bearings 66 which are seen in the section FIGURE 13. The rollers 64 at the rear ends of the fork-arms 62 are carried on ball bearings 67 mounted on stub axles 68 welded to the interior of the fork-arms 62, so that they travel with the fork-arms. Each fork-arm 62 is capable of being slid fore and aft on its root member 61 by means of a hydraulic ram 69 and cylinder 70, the cylinder 70 being on the centre line of the root member 61 and fixed thereto while the ram 69 extends forwardly and is secured to tip end of the fork-arm at 71 (FIGURES 11 and 12). It will be noted from FIGURE 13 that the box-section root member 61 of the fork-arm has welded along one side of it a channel-member 72 in which the roller 64 runs. The two sliding fork-arms are connected with each other by an upright back plate 73 which is welded to them and located at their rear end just in front of the side members 60 of the depending load-lifting arm which carries the fork root-members 61. The side members 60 themselves are braced together by a vertical plate 74, best seen in plan in FIGURE 11.

Referring again to FIGURES 5 and 6, it can be seen here (FIGURE 6) that the extending mast 18 carries near its lower end rollers 80 which run on the interior of the rear flanges 81 of the fixed mast 17. The fixed mast 17 carries at its upper end rollers 82 which run on the interior of the rear flange 83 of the extending mast. The extending mast 18 is further guided laterally by rollers 87 which are carried on stub axles secured on its rear flange 83 and which run on the inner edges of flange 81 of the fixed section 17 of the mast. The carriage 19 carries rollers 84 near its upper end which run on the outer edges of the front flange 85 of the extending mast and it carries rollers 86 near its lower end which run on the inner edges of flange 85. The carriage 19 furthermore has rearwardly extending side-plates 88 outside the mast on which are anchoring members 89 for a chain 90. Between the flanges 81, 91 of the fixed section 17 of the mast, on each side of the truck, there is a lifting cylinder 92 with a ram 93 at the top which is fixed to a plate 94 secured to the top of the extending section 18 of the mast.

The ram 93 is connected to plate 94 by a sheave 95 and the sheave 95 carries a chain pulley 96. The chain 90 is run from the anchoring point 89 on carriage 19 over the pulley 96 and secured to an anchoring point 97 on the fixed mast section 17. Thus if the rams 93 of the cylinders 92 are extended, they lift the extending section 18 of the mast directly by the engagement of their sheaves 95 with the top-plates 94. They lift the carriage 19 at double the speed of lift of the mast by the action of chains 90, anchored at 97 to the fixed mast and running over pulleys 96 on the sheaves 95 and thence to the anchoring points 89 on the carriage.

It would not do to leave the lift of the carriage thus, because in the event of the load being lop-sided the ram 93 on the side with the lighter weight would tend to lift more than the other and the carriage might become canted. Therefore, the upper end of the fixed mast 17 has secured to its rear flange 81 on each side a bracket 98 with an anchoring point 99 for a roller chain 100 which hangs down below the bracket 98 and extends below a chain sprocket 101 at the lower end of a bracket at the bottom of the extending section 18 of the mast. From here the chain 100 extends upwardly to an anchoring point 102 on the bracket 20 of the carriage 19. The sprocket 101 can be seen in FIG. 14 and in dotted lines in FIGURE 2 of the drawing and parts of it can be seen in FIGURE 5 below a roller 103 on the bracket 98 which helps to guide the upper end of the extending section 18 of the mast. The two sprockets 101 are rigidly mounted on a cross-shaft 104 which causes them to rotate together and as the chain 100, being a roller chain, cannot slip on the sprockets, the result is that both the sides of the carriage 19 are caused to rise at the same rate irrespective of any unevenness of load.

It has already been pointed out that the carriage 19 supports on rollers 21 an auxiliary mast section 22 to which the operator-platform 23 is secured and it will be seen from FIGURE 3 and 4 that the auxiliary mast 22 may either project above the level of the bracket 24 which carries the load, as shown in FIGURES 3, or may be lowered so that its upper end is level with the top of the bracket 24. The mechanism by which this is effected is shown in FIGURE 10 of the drawing. The upper end of the auxiliary mast carries a plate 110 at each side to which plates there are secured hydraulic cylinders 111 having downwardly depending rams 112 on the lower end of each of which is a sheave 113. A chain 114 extends from an anchoring point 115 on the carriage 19 below a pulley 116 on the sheave 113 and thence to an anchoring point 117 on a bracket 118 on the mast 22. The result is that the weight of the auxiliary mast 22 is supported by hydraulic pressure in the upper end of cylinder 111, the downward reaction on the pulley 116 being divided between the two portions of the chain to left and right of the pulley 116 where it is anchored to the carriage 19. If the pressure above ram 112 is reduced the auxiliary mast 22 will be lowered and the ram 112 will also fall but only at half the speed of the mast, so that the ram is in effect shortened.

On one of the plates 94 on the extension mast there is a limit switch 125, best seen in FIGURE 4, which operates when the operator-platform reaches its uppermost position and cuts off further supply to the jack 111, FIGURE 10. Another limit switch indicated at 126, FIGURE 10, operates at the bottom of the travel of the operator-platform relatively to the extension mast and actuates a signal to the operator that he is at the bottom of his travel and that if the forks need to be lower this needs operation of the carriage 19 downwardly relative to the auxiliary mast and its platform 23.

The operator, standing on the operator-platform 23, is surrounded by a fence 120 and guarded overhead by guard bars 121. He is provided with a steering wheel 122 which is connected by flexible hydraulic pipes to the steering mechanism of the rear wheels 13 and he is provided with control levers 123, 124 and, if necessary, with others not shown, which are all connected by flexible connections from the control carriage to the various hydraulic cylinders and the traction motor of the truck, the flexible connections running from the carriage for the operator to the various parts of the truck over guide pulleys as may be required. Thus, the operator can control the truck in all respects and at the same time he rises and falls with the load and therefore is able at all points to see exactly what he is doing. The mechanism of the flexible remote control connections between the steering wheel 122 and the control levers 123, 124 and the parts which they operate, is well-known in itself and does not require to be herein described. The steering mechanism between the wheels 13 is preferably of the type described in U.S. Patent No. 3,059,944.

As will be seen, the reaching motion of the carriage 40 is added to by the further reach motion of the fork arms 62 on the root members 61 and as can be seen from the plan of the apparatus in FIGURE 1, if the turntable 25 is rotated the reach mechanism can be made to reach the load forward or to either side of the truck as may be desired.

I claim:

1. A material handling apparatus comprising a wheeled truck, a mast on said truck, a load-lifting carriage movable vertically on said mast, material handling means mounted on said carriage, power operated means for so moving the carriage, an operator's platform supported on and movable vertically with said carriage, means for moving said operator's platform vertically with respect to said carriage independently of the movement of said carriage, whereby the operator may move the operator's platform up and down to enable him to observe the material handling operation without moving the load, said mast being located between the material handling means and said operator's platform.

2. The apparatus of claim 1 wherein the operator's platform is mounted on an auxiliary mast carried by the carriage and a pressure fluid operated jack is provided for moving the platform relative to the carriage.

3. A material handling apparatus comprising a truck, steering and driving wheels located at the rear end of the truck, a mast located at the front end of the truck, a load-lifting carriage movable vertically on said mast and disposed forwardly thereof, material handling means mounted on said carriage, an operator's platform supported on and movable vertically with said carriage and disposed rearwardly of the mast, said truck including a low body portion connecting said wheels with the mast and being sufficiently long to receive the operator's platform, said operator's platform being further movable vertically with respect to said carriage independently of the movement of said carriage, whereby the operator may move the operator's platform up and down to enable him to observe the material handling operation without moving the load, means for moving said carriage and means for moving said operator's platform.

4. The apparatus of claim 3 wherein the operator's platform is mounted on an auxiliary mast carried by the carriage and a pressure fluid operated jack is provided for moving the platform relative to the carriage.

References Cited by the Examiner

UNITED STATES PATENTS

| | | | |
|---|---|---|---|
| 2,375,104 | 5/45 | Heitshu | 187—9 X |
| 2,505,465 | 4/50 | Lehmann | 187—9 |
| 2,598,865 | 6/52 | Turner | 214—731 X |
| 2,645,306 | 7/53 | Turner | 187—9 |
| 2,699,879 | 1/55 | Bertram | 214—730 X |
| 2,709,017 | 5/55 | Ulinski | 214—730 |
| 2,818,189 | 12/57 | Schreck | 214—731 X |
| 2,820,561 | 1/58 | Mgagher | 187—9 |
| 2,910,204 | 10/59 | Wight | 214—730 |
| 2,935,161 | 5/60 | Comfort | 214—673 X |
| 3,031,091 | 4/62 | Erickson | 214—730 |

FOREIGN PATENTS

| | | |
|---|---|---|
| 1,026,688 | 3/58 | Germany. |
| 885,824 | 12/61 | Great Britain. |

GERALD M. FORLENZA, *Primary Examiner.*

MORRIS TEMIN, *Examiner.*